UNITED STATES PATENT OFFICE.

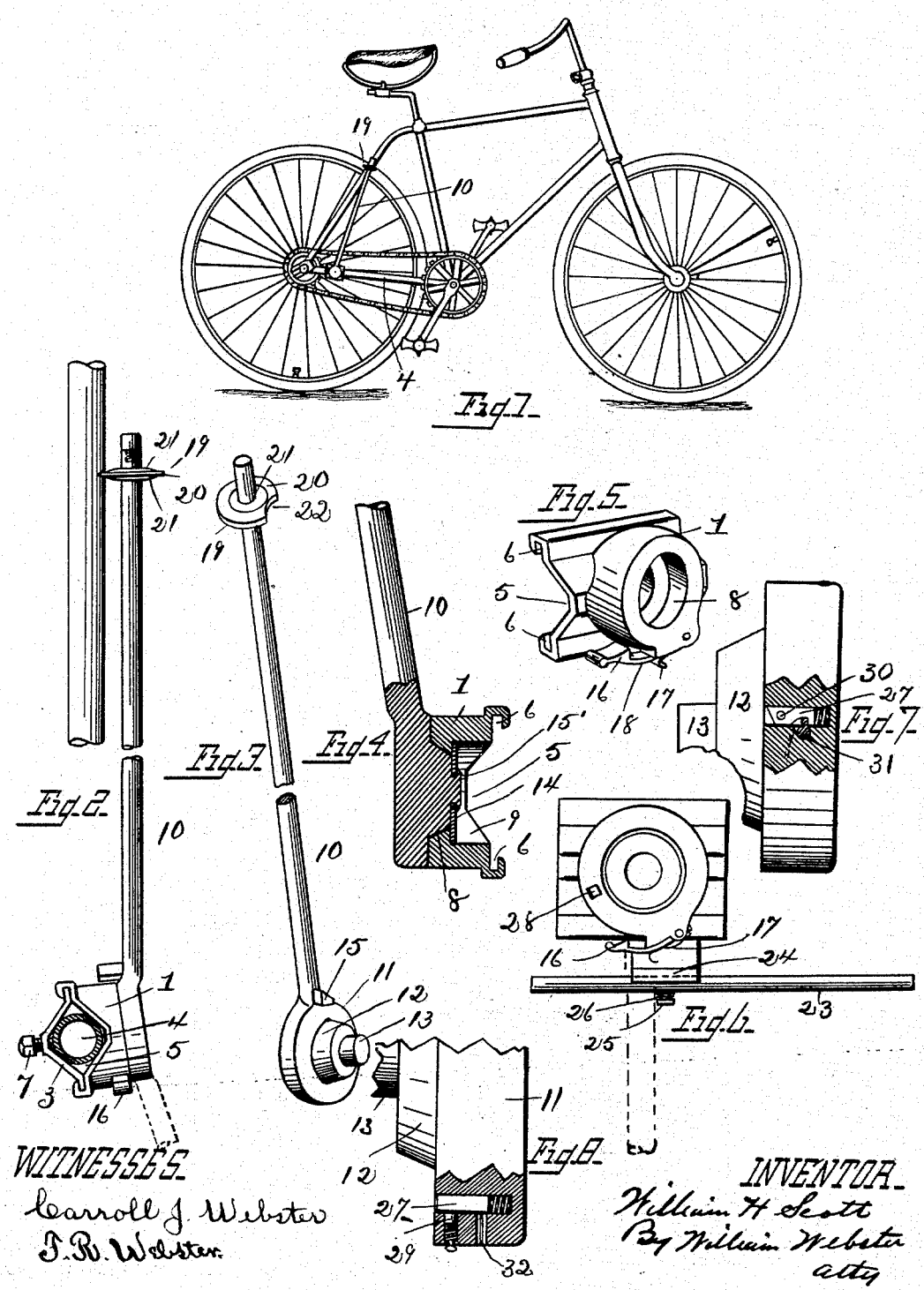

WILLIAM H. SCOTT, OF TOLEDO, OHIO.

BICYCLE-SUPPORT.

SPECIFICATION forming part of Letters Patent No. 526,543, dated September 25, 1894.

Application filed September 11, 1893. Serial No. 485,234. (No model.)

*To all whom it may concern:*

Be it known that I, WILLIAM H. SCOTT, of Toledo, county of Lucas, and State of Ohio, have invented certain new and useful Improvements in Bicycle-Supports; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to a bicycle support, and has for its object to provide a support attachable to any wheel frame, and capable of being folded when the wheel is in motion, or dropped to sustain the wheel when in rest.

A further object is to provide a combined support and lock whereby the vehicle may be supported and the wheel locked from revolution.

A further object is to provide a lock for the wheel, a support for the bicycle, which when extended, secures the lock for the wheel and a lock for the support.

The invention consists in the parts and combination of parts hereinafter described and pointed out in the claims.

In the drawings: Figure 1 is a side elevation of a bicycle showing the support folded. Fig. 2 is an elevation of the support shown in side elevation with the frame to which it is attached, shown in section. Fig. 3 is a rear elevation of the supporting leg detached from its coupling. Fig. 4 is a side elevation partly in section of the leg and frame coupling. Fig. 5 is a perspective view of one section of coupling, showing the catch for holding the leg in extended position. Fig. 6 is a front elevation of the same section showing a lock attachment for the wheel, the full lines showing the locking bar in normal position, or as out of engagement with the wheel, and in dotted lines as in position to engage with the spokes of the wheel, and the leg in position to secure the lock. Fig. 7 is a side elevation of the head of the leg, showing the locking bolt for securing the leg in extended position; and Fig. 8 is a detail section of the head of the leg, showing the locking bolt for securing the leg in extended position, and the spring dog for holding the locking bolt retracted.

In providing for attachment of the support to bicycles of different constructions, there is a coupling employed which embraces the frame, and in which the leg is journaled. This coupling is preferably composed of two sections, the main section 1 formed with a boxing 2 to receive the head of the leg, and the section 3 for embracing the opposite side of the frame 4. Section 1 is formed on the rear side with a recess 5 into which the frame 4 seats with one half of its diameter, and with ways 6 into which the opposite section 3 of like contour slides to embrace the opposite half of the frame 4, and is held in position by means of a set screw 7 which closely assembles the sections and clamps the same firmly on the frame. The front side of section 1 has a conical recess 8 which extends through one half its thickness, and the rear side has a circular recess 9 of greater diameter than the apex of recess 8.

10 designates the leg formed with the head 11 of circular form, from which projects a conical bearing 12 which fits within conical recess 8 of section 1, and has a circular projection 13 which projects into recess 9, through a washer 14, and is peened or riveted over the same as at 15' to secure the parts together.

From the head 11 the leg 10 projects at an angle, and is of a length to reach the ground when extended, and the bicycle slightly inclined toward the same. Upon the head 11 of the leg is formed an inclined projection 15, which engages with a catch 16 upon section 1 of the coupling to lock the leg in extended position, the catch being urged into engagement by means of a spring 17 secured to the section and bearing upon the spring. I may however construct the catch with a spring shank 18, and dispense with the spring 17.

In order to hold the leg in an upright or folded position, as shown in Fig. 1, there is provided a friction bearing 19 near the outer end, comprising a compressible disk 20, preferably of rubber, which is clamped between two metal plates 21, and having a slight recess 22 formed in the periphery to fit the frame when the compressible material is slightly compressed, thereby holding the leg firmly in place without jar or abrasion of the frame.

In Figs. 6, 7, and 8 I have shown a locking mechanism, comprising a bar 23 adapted to be turned from parallel relation with the wheel to a position transversely of the same, and into engagement with spokes of the wheel to prevent the revolution of the same until the bar is again turned to its parallel position.

Bar 23 is normally seated in a groove formed in a projection 24 either formed integral with or secured upon section 1, and is held in the groove by means of a pin 25 projecting therefrom, which passes through the bar, and serves as a pivot upon which it turns, and is provided with a coiled spring 26 which bears upon the head of the pin and presses upwardly upon the bar with sufficient force to hold the same into the groove, and prevent rattling.

The relation of bar 23 and leg 10 is such that when the bar is turned to engage the spokes of the wheel, and the leg is lowered as a support for the bicycle, the leg drops immediately at the side of the bar, and locks the same from being returned to the groove until the leg is elevated. In this construction, that is, when the locking bar is combined with the support, I provide for locking the leg when extended and in this manner securely lock the locking bar by means of a bolt 27 within the conical head, which is normally urged into a perforation 28 formed in section 1, which when in perforation 28 securely locks the leg in extended position.

Bolt 27 is held retracted by means of a spring dog 29 which enters a perforation 30 in the bolt 27 when retracted, and allows the bolt to enter perforation 28 when the dog is withdrawn. In order to withdraw bolt 27 from its engagement in perforation 28, a key 31 is inserted in a keyway 32 in the head, and engages with the bolt to withdraw the same as the key is turned, when dog 27 engages in perforation 30 and the leg may be raised and the locking bar turned.

It will be seen that the support may be used with or without the locking mechanism, and that in either case, the device is simple, strong, and inexpensive.

When used without the locking mechanism, the rider dismounts and presses upon catch 16, when the leg may be turned until the compressible disk engages frictionally with the frame.

In order to render the disk adjustable to compensate for frames of different sizes, I usually thread the leg and plates, as shown, to allow of any desired adjustment.

What I claim is—

1. In a bicycle support, a bearing secured upon the frame having a lug upon the periphery of the same, a leg journaled upon the bearing having a lug, a frictional disk upon the outer end of the leg for engagement with the frame to hold the leg in a raised position, and a spring catch upon the bearing for engaging the lug upon the leg to hold the same in a lowered position.

2. In a bicycle support, a leg journaled upon the frame, a locking bar pivotally supported thereon, adapted to be moved transversely of the wheel and be locked by the leg, and a lock for the leg.

3. In a bicycle support, a coupling for attachment to the frame, a leg journaled in the support, a locking bar secured upon the pivot upon the coupling, and held in close relation therewith by means of a spring and adapted to be moved into engagement with the wheel and be locked by the movement of the leg, and a lock for securing the leg from movement.

4. In a bicycle support, a leg pivoted upon the frame having a frictional disk upon the outer end for engagement with the frame when raised.

In testimony that I claim the foregoing as my own I hereby affix my signature in presence of two witnesses.

WILLIAM H. SCOTT.

Witnesses:
WILLIAM WEBSTER,
F. R. WEBSTER.